United States Patent

[11] 3,616,415

[72] Inventors Frederick D. Watson;
Weldon D. Mayse, both of Houston, Tex.
[21] Appl. No. 836,542
[22] Filed June 25, 1969
[45] Patented Oct. 26, 1971
[73] Assignee Petrolite Corporation
St. Louis, Mo.

[54] AXIAL CORROSION RATE PROBE
14 Claims, 7 Drawing Figs.
[52] U.S. Cl.................................................. 204/195,
204/286, 204/297 R, 324/71 C
[51] Int. Cl........................................................G01n 27/46
[50] Field of Search.......................................... 204/1 T,
195, 286, 297 R; 324/71 C

[56] References Cited
UNITED STATES PATENTS
2,926,128 2/1960 Flower .......................... 204/196
3,098,801 7/1963 Marsh ........................... 204/195
3,334,039 8/1967 Vlasak........................... 204/195
3,486,996 12/1969 Annand......................... 204/195
3,491,012 1/1970 Winslow........................ 204/195

Primary Examiner—T. Tung
Attorneys—Emil J. Bednar and Sidney B. Ring

ABSTRACT: An axial corrosion rate probe having tubular metal electrodes, cylindrical insulator spools, a round-nosed end cap and a tubular metal base interfitted into a nested arrangement. An insulator spool separates the electrodes from one another and from the base with the spools telescoped into the electrodes and the base. A central cylindrical passageway extends through the base, insulators and spools. Electrical conductors extend from the electrodes through the central passageway into the base. A nonconductive elastomer fills all voids in the central passageway, and forms the end cap. The elastomer extends from the central passageway through openings in the spools to encircle each of the spools with an exposed cylindrical surface which extends longitudinally between adjacent electrodes. The base, electrodes, elastomer-surrounded spools and end cap preferably have a uniform diameter exposed cylindrical surface. The elastomer integrally connects elements of the probe into a unitary elongated structure.

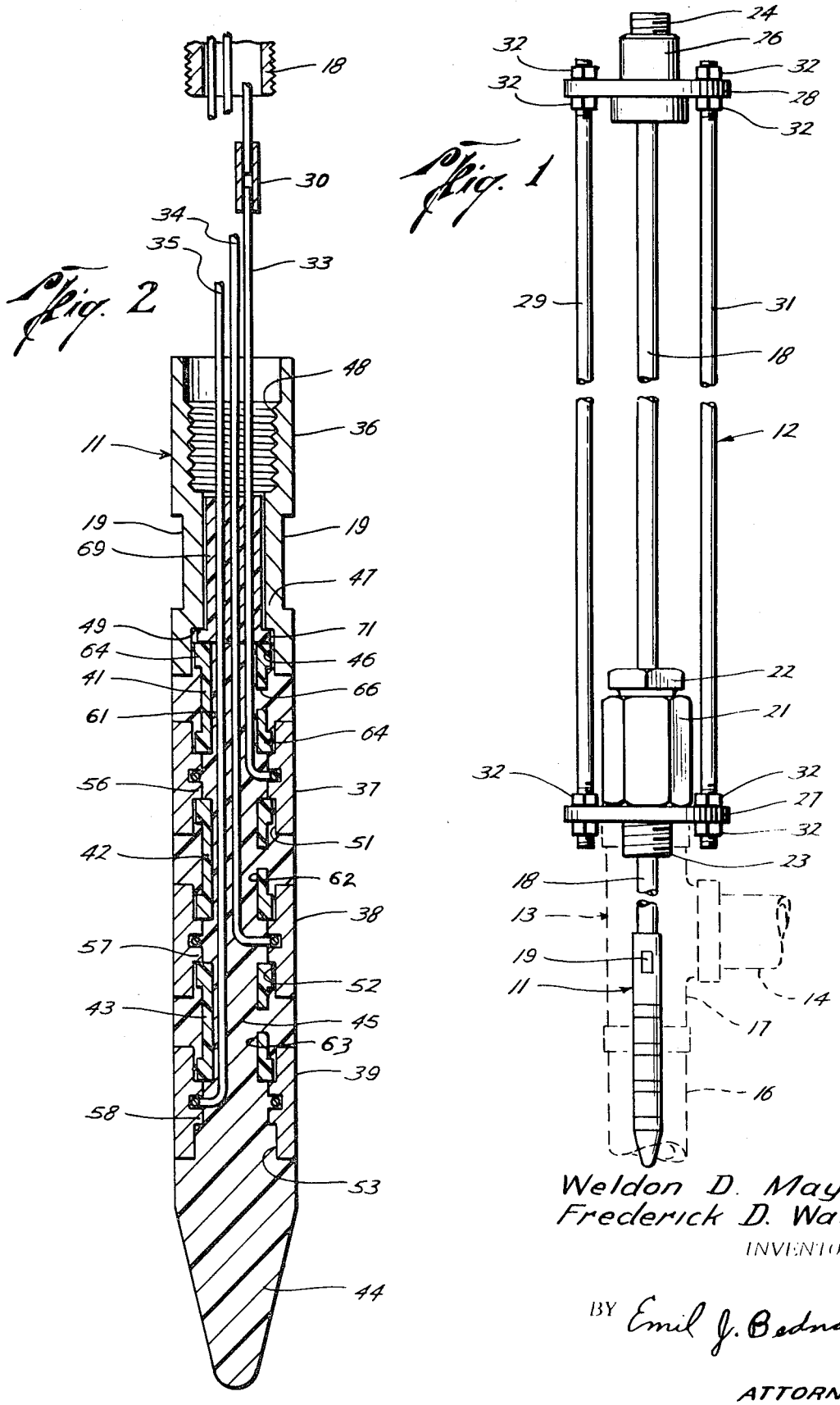

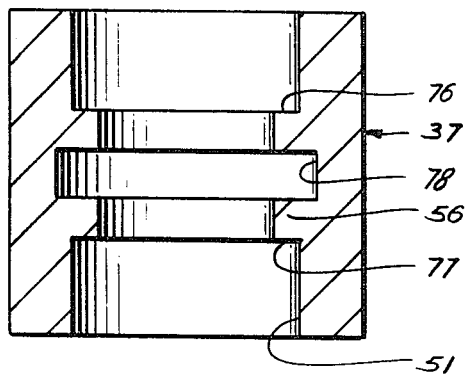
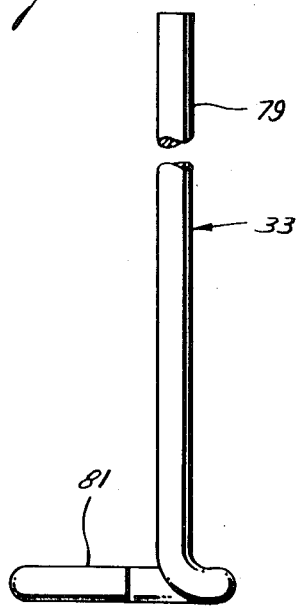
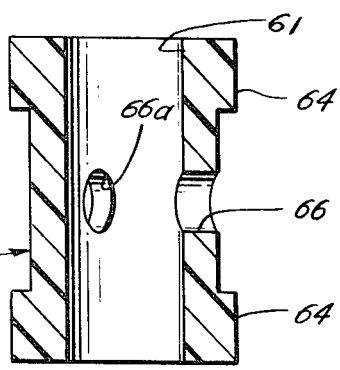
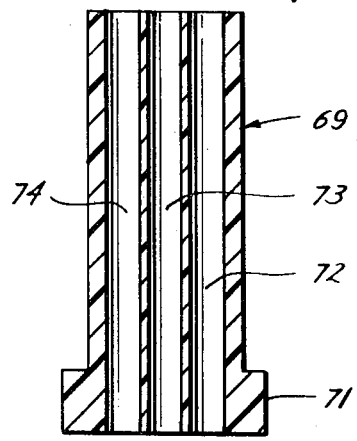
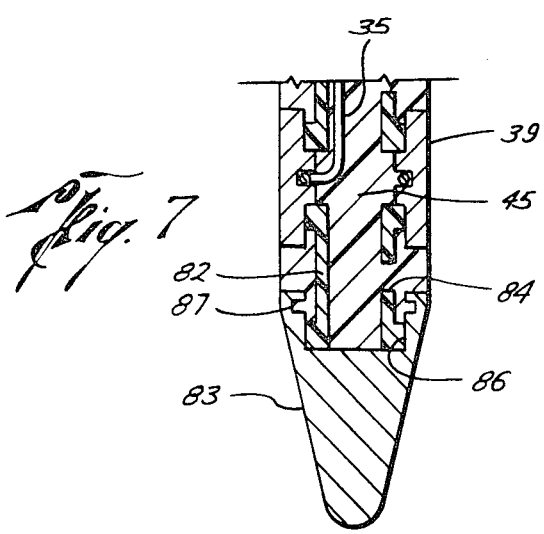

3,616,415

AXIAL CORROSION RATE PROBE

Background of the Invention

1. Field of the Invention

This invention relates to measuring and testing corrosion processes, and it relates more particularly to the instruments and electrical-chemical techniques used in the study of corrosion processes.

2. Description of the Prior Art

It is often desired to determine the rates at which metals corrode within a corrodant such as a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe which carries a plurality of electrodes immersed within the corrodant. Probes have been lowered into oil wells to study downhole corrosion effects, to evaluate inhibitors, and even to determine production variables which influence the rate of corrosion on exposed metals. Probes have also been used to monitor the rate of corrosion of metals containing flood waters that are employed to stimulate oil production from subterranean reservoirs. The probes usually employ a plurality of electrodes which are insulated from one another. Generally, the electrodes are metals. The electrodes in the corrosive liquid undergo certain electrochemical changes that are related to the rates of corrosion of specific metals. Thus, the rate of corrosion can be correlated with the electrochemical effects upon the metallic electrodes of a probe immersed in the corrosive liquid.

An electrochemical process and apparatus especially useful in measuring corrosion rates is described in U.S. Pat. No. 3,406,101. In this patent, there is described a corrosion rate meter which includes a probe having three electrodes adapted to be exposed to a corrodant such as a corrosive liquid, an adjustable current source, an ammeter and a high impedance voltmeter as primary components. The adjustable current source applies a small electric current between a "test" electrode and an "auxiliary" electrode. At the same time, the voltmeter monitors the polarization potential between the "test" electrode and a "reference" electrode. The current flow slightly polarizes the surface of the "test" electrode, and as a result, causes a shift in the potential between the "test" and "reference" electrodes. The current flow required to produce 10 millivolts polarization is directly proportional to the corrosion rate of the "test" electrode undergoing corrosion.

If the corrosion rate is low, a very small current flow will polarize the "test" electrode. If the corrosion rate is high, much more current flow is required to polarize the electrode. The weight of metal loss from the electrode (by electrochemical corrosion) is directly proportional to the current flow in accordance with Farraday's Law. Thus, by use of appropriate constants and adjustments of the exposed surface area of the "test" electrode, the ammeter can be calibrated directly into any desired units of corrosion rate providing the surface area of the "test" electrode is kept constant. Obviously, the initial surface rate of the electrode exposed to the corrodant can be adjusted into the desired range. In order to provide symmetry of the probe, and for other reasons, the exposed surface areas of all electrodes are usually made identical. Thus, if the electrodes are constructed of the same material, such as 10-20 mild steel, any of the electrodes may serve as the "auxiliary," "test" and "reference"-type electrodes in electrochemical techniques for determining the rate of corrosion.

Although the probe can be manufactured with certain exposed surface areas of the electrode, the corrodant can cause a change in the exposed surface area of the electrodes. For example, probes manufactured with conventional techniques to produce insulation or fluid seals between the electrodes, internal electrical conductors and other adjacent metallic components can be used in aqueous corrosive systems under only the most modest temperature and pressure conditions and physical impacts. The differential movement of the probes' elements under severe environmental conditions, especially at high pressures or elevated temperatures, cause the insulation or fluid seals between the electrodes and adjacent metallic components to fail. As a result, the corrodant contacts increased metallic surface areas on the electrodes and adjacent metal components which are connected (like the electrodes) by circuitry with the corrosion rate meter. It has been found these undesired variations in the exposed surface areas of metals including the electrodes in contact with a corrodant cause erroneous results to be obtained on the corrosion rate meter.

Additionally, voids within the probe can accumulate corrodant which has leaked past fluid seals. This accumulation of corrodant within the probe is usually in contact with either the inner electrode surfaces, electrical conductors which connect the electrodes to an external corrosion rate meter, or other metal components. The corrodant within the probe, in time, will be different in corrosive-action from the corrodant exteriorly of the probe. Generally, the corrodants are sufficiently different to vary the desired function of the electrodes. As a result, the probe fails to perform its desired function with the corrosion rate meter.

A recalibration of a probe which is leaking corrodant between fluid seals sufficiently to vary the effective surface area of all the metal "electrodes" may be obtained. However, this calibration is neither sufficiently static nor dependable in time. Therefore, corrosion rate determinations with a "leaking" probe are not acceptable for practical purposes.

It is the purpose of this invention to provide an axial corrosion rate probe which has no voids to accumulate corrodant and resilient fluid seals which remain intact. Additionally, the probe is arranged to be flexible and resilient so that variations in structural dimensions reflecting physical impacts, extreme pressure and temperature conditions, cannot cause variations in the surface area of the electrodes exposed to corrodant. Thus, the probe of this invention can be employed in extreme environments with no substantial changes occurring in the surface area of the electrodes which are exposed to the corrodant. Thus, the present probe will maintain its calibration directly in the units of corrosion rate for which it was originally calibrated with a corrosion rate meter.

SUMMARY OF THE INVENTION

In accordance with this invention, there is provided an axial corrosion rate probe especially suited for determining the corrosion rate of a metallic material in a liquid corrodant by means of polarization measurements. The probe comprises a metal base, a plurality of metal electrodes, and a plurality of insulator spacers each having a central passageway. The metal base and electrodes have a central passageway into which the insulator spacers can telescope. The electrodes, spacers and base interfit into a nested arrangement with an insulator spacer separating the electrodes from one another and the base. An end cap is adapted to be carried at the end of the central passageways of the adjacent electrode and spacer, which end is remote from the base. Separate electrically conductive means are connected to the electrodes and extend through the central passageways within the electrodes, insulator spacers and into the base. Means including an elastomer molded into the central passageways, substantially filling same, integrally connect the electrodes, insulator spacers, end cap and base into a unitary elongated structure substantially free of voids.

BRIEF DESCRIPTION OF THE DRAWINGS

FIG. 1 is a prospective view, partially in phantom, of one probe embodiment of this invention mounted in a piping system;

FIG 2. is an enlarged cross section of the axial probe shown in FIG. 1;

FIG. 3 is an enlarged cross section of an electrode employed in the probe of FIG. 2;

FIG. 4 is an enlarged prospective view of an electrical conductor employed in the probe of FIG. 2;

FIG. 5 is an enlarged cross section of an insulator spacer employed in the probe shown in FIG. 2;

FIG. 6 is an enlarged cross section of an insulating thimble employed for spatially positioning the electrical conductors in the probe shown in FIG. 2 (the section being taken along two planes intersecting at 60° and passing through openings in the thimble); and FIG. 7 is a partial cross section of one end of a second embodiment of the probe shown in FIG. 1.

DESCRIPTION OF SPECIFIC EMBODIMENTS

In FIG. 1, there is illustrated an axial corrosion rate probe 11 of the present invention. The probe 11 is mounted upon an extension shaft assembly 12 for ready extension into a piping system 13 carrying a corrodant upon which the corrosion rate measurements are to be effected. This arrangement for introducing the probe 11 into the piping system 13 is of good utility. However, it is to be understood that the probe 11 may be mounted upon any other type of structure for placement into contact with a corrodant such as an aqueous corrosive liquid carried in the piping system 13, or the like.

For illustrative purposes, the piping system is comprised of pipes 14 and 16 interconnected by a tee 17 so that a corrosive liquid may be flowed between any two points in an operative system. The probe 11 is mounted on the extension 12 at one end of the tee 17.

The extension 12 includes a pipe 18 to which the probe 11 is threadedly secured. The probe 11 carries noncircular portions or "flats" 19 engageable by a wrench during mounting of the probe 11 upon the pipe 18. The pipe 18 passes through a packing gland 21 provided with a compression nut 22 for securing a fluidtight engagement between the packing gland 21 and the pipe 18. The lower extremity of the packing gland 21 carries threads 23 which are adapted to screw into one end of the tee 17. An electrical connector 24 is mounted upon a tubular flange member 26 at the other end of the pipe 18. Electrical conductors extend between the electrical connector 24 and the electrodes carried upon the probe 11 for providing electrical circuits between each of these electrodes and an external corrosion rate meter (not shown).

The pipe 18 can be reciprocated within the packing gland 21 and secured against displacement by adjustment of the compression nut 22. However, it is preferred to provide a jacking means for moving the probe 11 into position within the piping system 13 and holding it against unintentional displacement at elevated temperatures and pressure conditions. For this purpose, a collar 27 is mounted between the packing gland 21 and the tee 17. A similar collar 28 is mounted above an enlarged portion of the flange member 26. Jackscrews 29 and 31 traverse the collars 27 and 29 in juxtaposition to the pipe 18. A plurality of nuts 32 are carried on the jackscrews to each side of the collars 27 and 28. The probe 11 can be reciprocated longitudinally within the pipe 16 by releasing the compression nut 22 sufficiently that the pipe 18 may be reciprocated through the packing gland 21. Then, the probe 11 is moved to a desired position and thereat locked against displacement by means of adjustment of the nuts 32 on the jackscrews 29 and 31. Lastly, the compression nut 22 is tightened to provide a fluidtight seal between the packing gland 21 and the pipe 18.

Although the extension 12 provides a mechanism of great utility in mounting the axial probe 11 within the piping system, the probe 11 may be mounted upon a pipe plug or bushing in the position illustrated by the packing gland 21. Then, the electrical connections would be made to the electrical conductors within the probe 11.

Referring to FIG. 2, one preferred embodiment of the axial corrosion rate probe 11 of the present invention is illustrated in detail. The pipe 18 is shown in an unthreaded and spaced apart position from the probe 11. The electrical conductors that extend through the pipe 18 from the probe 11 to the electrical connector 24 are shown with one of the electrical conductors connected by crimped splice connector 30. It being understood that each of the electric conductors may be a continuous wire or wire-lengths interconnected by suitable means such as the connector 30.

The probe 11 has a metal base 36, two or more metal electrodes 37, 38 and 39 and insulator spacers 41, 42 and 43. The base, electrodes and insulator spacers have a central passageway into which the insulator spacers can telescope. The base 36, electrodes 37, 38 and 39 and insulator spacers 41, 42 and 43 are interfitted into a nested arrangement. An insulator spacer separates the electrodes from one another and the base 36. An end cap 44 is adapted to be carried at one end of the central passageway of the adjacent electrode and insulator spacer which end is remote from the base 36. Electrical conductors 33, 34 and 35, which form separate electrically conductive means, extend through the central passageways within the electrodes, insulator spacers and into the base 36. The electrical conductors may be extended from the base 36 any distance to a corrosion rate meter, or interconnected electrical conductors may be used for this purpose. The electrical conductors are secured at one of their ends to the electrodes by a low-resistance electrical connection. Any suitable connection may be used to secure the electrodes and conductors together, such as by welding, crimping, brazing, or mechanical engagements. A resilient elastomer 45 substantially fills the central passageways of these elements and integrally connects the nested arrangement of electrodes, insulator spacers, end cap and base into the unitary elongated corrosion rate probe 11.

The probe 11 may be constructed of tubular elements, preferably of circular cross section, so that the axial probe 11 can have uniform cylindrical exterior side surface extending from the flats 19 to the end cap 44. However, the axial probe 11 may be constructed with a noncircular cross section or nonuniform cylindrical exterior side surface, if desired.

The metal base 36 has an axial central passageway 46 with a central portion of reduced dimension 47 which forms at least one abutting shoulder 49. Internal threads 48 may be provided at one end of the central passageway 46 to permit a ready interconnection of the base 36 to the pipe 18. Where the base 36 is tubular, the central passageway 46 can be cylindrical. The base 36 may be formed of a suitable structurally rigid metal, such as steel, Monel or stainless steel.

The electrodes 37, 38 and 39 are provided with axial central passageways 51, 52 and 53. Preferably, the electrodes are tubular and the central passageways are cylindrical with uniform dimensions. The central portion of the electrodes 37, 38 and 39 have reduced dimensional portions 56, 57 and 58, respectively. The reduced dimension portions provide oppositely facing abutment shoulders within the cylindrical passageways in the electrodes.

The electrodes 37, 38 and 39 may be formed of any suitable conductive metal. Preferably, the electrodes are fabricated from 10–20 mild steel. However, metals such as iron, aluminum, copper, brass, lead, nickel, titanium, tantalum, zirconium, chromium and alloys thereof may be used under similar conditions.

The insulator spacers 41, 42 and 43 are provided with central passageways 61, 62 and 63. Preferably the spacers are cylindrical and can have a form like a spool. For this structure, the insulator spacers carry enlarged dimension end portions relative to intermediate central portions. The end portions are arranged by proper dimension to telescope into the central passageways, and to engage the abutment shoulders, in the electrodes and the base. More particularly, the insulator spacers are preferably formed with cylindrical interior and exterior surfaces with circular rims formed at each of their ends, such as rims 64 shown for the insulator spacer 41. The rims 64 have a selected radius that the spacers 41 telescope readily into the cylindrical passageways but engage positively the abutment shoulders of the electrodes and the base.

Referring to FIG. 5 there is illustrated an insulator spacer 41 which has an opening 66 in its sidewall intermediate the rims 64. If desired additional openings may be provided in the insulator spacer 41 such as opening 66a shown in FIG. 5.

The insulator spacers 41, 42 and 43 may be formed of any suitable material which is structurally rigid and has a high electrical resistivity. The spacers may be formed of a variety of substances such as hard rubber, various synthetic polymeric materials, laminated phenol materials, plastics, etc. However, it is preferred that the spacers be formed of an epoxy polymer which contains fiberglass reinforcement. This material is commonly called "glass-filled epoxy" and is available commercially under the trade name "Kemlox BH." This material (glass-filled epoxy) is ideally suited for the spacers sine it provides exceptional electric insulator properties, readily machines and maintains a highly rigid structure for internesting with adjacent electrodes and base forming the probe 11.

In order to facilitate placing the elastomer 45 into the nested arrangement of base, electrodes etc., the insulator spacers 41, 42 and 43 can have sidewall openings 66, 67 and 68, respectively. However, this opening could be provided by proper clearances, or cuts, in the rims of the insulator spacers or at other places in either the spacers or electrodes and base.

The base, electrodes and spacers are interfitted into a nested arrangement with an insulator spacer separating the electrodes from one another and from the base. The ends of the spacers engage the abutment shoulders in the electrodes and base. The electrical connectors 33, 34 and 35 are electrically connected to the respective electrodes. The electrical conductors extend through the central passageways into the base 36. However, the electrical conductors may extend beyond the base to any desired location to provide electrical connection to an external corrosion rate meter (not shown).

The nested arrangement of the described probe elements is positioned within a suitable molding apparatus. Then, a resilient elastomer is molded into the central passageways within the electrodes, spacers and base. The elastomer 45 substantially fills the central passageways and leaves no voids of any sufficient volume that would permit displacement of the elastomer under elevated temperature and pressure conditions in an amount sufficient to cause passage of a corrosive fluid into the internal portions of the probe 11 or to vary the surface area of the electrodes exposed to corrodant. The mold may also provide for the elastomer 45 to form the end cap 44 at one end of the central passageways of the adjacent electrode 39 and spacer 43. Preferably, the end cap 44 is formed cylindrical and has a round nose. The elastomer 45 extends as a continuous body from the central passageways through the openings 66, 67 and 68 of the spacers and encircles each of the spacers with an annular portion having an exposed surface extending between adjacent electrodes. The elastomer passing through the openings of the spacers serves as a resilient "locking pin" to secure together the internested arrangement of elements forming the probe 11. Preferably, the exposed surface of the elastomer encircling the insulator spacers has a cylindrical exterior surface.

It will be apparent that the probe 11 can be provided with an exposed cylindrical surface of uniform radius extending longitudinally throughout the length of the probe 11. Thus, the probe 11 can have a very uniform cylindrical external surface which permits improved mechanical and hydraulic environments for contacting the corrodant without turbulence over surface irregularities.

The resilient elastomer 45 may be provided by any thermal setting material which is acceptably inert to attack by the corrodant to which the probe 11 will be exposed. For example, the elastomer may be formed of a resilient rubberlike material that is bonded to the electrodes, base and spacers. By "bonded" as the term is used herein, it is meant a sufficient engagement between the elastomer and rigid surfaces that the resultant joint is fluidtight in normal uses. For example, the elastomer can be Viton (a trademark of Haveg Corp.), Buna N, Neoprene, and other materials well known to the molding arts. Preferably, the resilient elastomer is Viton. Usually the elastomer is molded in a suitable mold under elevated pressures and temperatures, for example 5,000 p.s.i. and 300° F. Under these conditions, the elastomer flows freely through the central passageways within the nested arrangement of elements and through the openings in the insulator spacers; surrounds the insulator spacers between adjacent electrodes; and upon setting, forms a fluidtight interconnection between adjacent electrodes, spacers, base and end cap.

The elastomer, as a result of molding operations, is under considerable compression in the central passageways, and also in the annular space between adjacent electrodes and between the rims of each spacer. Since the elastomer is a continuous body throughout the probe 11, the elements of the probe 11 are joined into a fluidtight unitary structure.

The elastomer 45 also integrally connects the base, electrodes, spacers and end cap into a resilient unit. Moreover, the elastomer 45, as a resilient material, provides some flexure between elements forming the probe 11. This flexure protects the probe 11 against physical and thermal forces causing leakage and undesired surface area exposure of the electrodes to a corrodant. Tus, high temperature and elevated pressure conditions cannot cause sufficient differential expansion effects between the various elements of the probe 11 that produce fluid leakage into the probe or vary the surface area of the electrodes exposed to corrodant. Additionally, the elastomer 45 as a continuous body extends from the central passageways, through the openings in the insulator spacers and encircles the spacers. Thus, the elastomer 45 provides a resilient mechanical interconnection of the various elements forming the probe 11. In this manner, the probe 11 can withstand physical impacts without injury to its integrity or component elements. Obviously, the elastomer 45 serves a multitude of functions provided in one molding operation during manufacture of the unitary probe 11.

It has been found that the physical properties of the probe 11 can be further enhanced by an insulator thimble 69 fixedly positioned within the central passageway 46 of the body 36. The thimble 69 has openings to receive the electrical conductors 33, 34 and 35. These openings serve to maintain the spatial positions of the electrical conductors within the central passageway of the base 36 during molding of the elastomer. The elastomer in filling the central passageways of the nested arrangement of the elements forming the probe 11 also secures the electrical conductors within the openings of the thimble 69 into a mechanical rigid and fluidtight relationship. Additionally, the thimble 69 is a rigid dam against pressure blowout to the elastomer 45 since it engages the shoulder 49 in the base 36.

Referring to FIG. 6 there is illustrated an enlarged cross section of the thimble 69 having openings 72, 73 and 74 uniformly spaced at 120° from one another. The thimble 69 can be formed of the same materials as the spacers, and preferably is cylindrical. The thimble 69 carries at one of its ends an enlarged dimensioned portion, such as rim 71, telescope within the central passageway 46 of the base 36. The openings 72, 73 and 74 receive the electrical conductors 33, 34 and 35 with a minimum clearance. As a result, these electrical conductors are maintained and spatially positioned within the central passageway of the base 36 during molding of the elastomer. The rim 71 engages the shoulder 49 and holds it against displacement from the base 36. The rim 64 of the insulator spacer 41 engages the rim 71 in the nested arrangement forming the probe 11.

The proper spacing and arrangement of the electrical conductors 33, 34 and 35 in the central passageways can present an obstacle in molding the elastomer into the probe 11. This difficulty may be overcome by manufacturing the electrical conductors from a metallic resilient wire that is substantially self-supporting in the nested arrangement forming the probe 11. Also, the electrodes are adapted to cooperate with such wire conductors to permit molding of the elastomer into the nested arrangement of elements without displacement of the electrical conductors 33, 34 and 35. For purposes of description, the arrangement of the conductor 33 and the electrode 37 will be given. However, it is to be understood that the other electrodes and conductors may be similarly arranged. Referring to FIGS. 3 and 4, the electrode 37 has a cylindrical central passageway 51. A reduced diameter portion 56 intermediate the central passageway 51 provides opposite facing abutment shoulders 76 and 77 which are adapted to engage the rims upon the insulator spacers 41 and 42, respectively. A recess 78, preferably an annular groove, is provided in the reduced dimensioned portion 56. The electrode 33 has a longitudinal portion 79 which extends from the electrode 37 through the central passageways into the base 36. At one end of the conductor 33 resides a transverse loop portion 81 which is dimensioned so as to be received in compression within the recess 78 of the electrode 37.

For example, the electrical conductor 33 is formed of a stiff, resilient-metallic wire. The loop 81 on the wire is circular with a diameter slightly greater than the maximum transverse dimension of the recess 78 in the electrode 37. Thus, the loop 81 can be received within the recess 78 with a snap ring type of engagement. The longitudinal portion 79 is displaced radially from the circular edge of the loop 81 a sufficient distance that the longitudinal portion 79 resides in spaced relationship to the reduced diameter portions of the electrodes and to each of the other electric conductors 34 and 35. Under these circumstances, the openings 72, 73 and 74 in the thimble 69 are aligned to accommodate such spacings of the electrical conductors. Thus, the electrical conductors are secured to the electrodes in adequate electrical connection. Their position is maintained throughout the nested arrangements of spools and electrodes and also by the thimble 69 in the base 36. With this arrangement, molding of the elastomer into the central passageways and about the insulator spacers cannot displace the electrical conductors 33, 34 and 35 sufficiently to cause undesired electrical interconnection to other metallic components of the probe 11. If desired, the loop 81 of the electrical conductor 33 may be welded, brazed or otherwise electrically secured into the recess 78.

In some environments, it may be desired that the end cap 44 is formed of a material other than the elastomer which is molded into the central passageways of the probe 11. An alternative end cap construction is shown in FIG. 7. The probe 11 is illustrated only between the electrode 39 and the end cap terminus. In this embodiment, an additional insulator spacer 82 with a sidewall opening 84 is telescoped into the electrode 39 in the same manner as the insulator spacer 43. An end cap 83 of any suitable material, for example steel, is provided with a cylindrical passageway 86 into which the spacer 82 can telescope. The end cap 83, spacer 82 and electrode 39 are interfitted into the nested arrangement of the remainder of the probe 11. The elastomer 45 is molded into the internested arrangement and passes through the opening 84 to encircle the spacer 82 between the electrode 39 and the end cap 83. The end cap 83 may be provided with a recess 87, preferably an annular groove, formed in its sidewall enclosing the central passageway 86. Thus, the elastomer fills the recess 87 and integrally connects the end cap 83 onto the end of the central passageway adjacent the electrode 39 and insulator spacer 82.

The probe 11 shown in FIG. 2 was subjected to tests for determining its integrity. The probe was placed into a silicone fluid (for protection against fire or explosions) and held at 300° F. and 1,000 p.s.i. for 24 hours. The probe was removed and cooled to 32° F. Then, it was again subjected to the elevated temperature and pressure conditions for 3 hours. The probe was intact and there was no evidence of physical injury nor leakage between joints of the elastomer and electrodes or base.

It will be apparent from the foregoing description that there has been described an axial corrosion rate probe formed by a plurality of nested interfitting elements which are connected into fluid tightness by an elastomer to form a unitary elongated structure of integrally connected elements. Further, this arrangement precludes any voids within the probe which under extreme pressure and temperature conditions can lead to the leakage of corrosive fluids into the probe whereby the surface area of the electrodes exposed to the corrodant varies uncontrollably. In this invention, any number of electrodes may be internesting with insulator spacers to form probes having sufficient electrodes for any desired monitoring service. In addition, the electrodes may be formed of any configuration, with like or dissimilar metals, and with any desired exposed surface areas.

Various modifications and alterations in the described probe will be apparent to those skilled in the art from the foregoing description which do not depart from the spirit of the invention. For this reason, these changes in structure are desired to be included within the scope of the present invention. The appended claims define the present invention; the foregoing description is to be employed for setting forth the specific embodiments as illustrative in nature.

We claim:

1. An axial corrosion rate probe comprising:
   a. a metal base;
   b. a plurality of metal electrodes;
   c. a plurality of insulator spacers each having a central passageway;
   d. said base and electrodes having a central passageway into which said insulator spacers can telescope;
   e. said electrodes, insulator spacers and base interfitted into a nested arrangement with said insulator spacers separating said electrodes from one another and from said base;
   f. an end cap adapted to be carried at the end of said central passageways of said electrodes and insulator spacers, said end of central passageways being remote from said base;
   g. separate electrically conductive means connected to said electrodes, and said conductive means extending through said central passageways within said electrodes, insulator spacers and into said base; and
   h. means including an elastomer molded into said central passageways for substantially filling said central passageways and extending therefrom laterally within openings in said spacers for integrally connecting said electrodes, insulator spacers, end cap and base into a unitary elongated structure.

2. The probe of claim 1 wherein each of said insulator spacers has an opening in its sidewall and said elastomer extends therethrough from said central passageways to surround the exterior of said insulator spacers between adjacent electrodes.

3. The probe of claim 1 wherein said metal electrodes each have in said central passageway a portion of reduced dimension forming abutment shoulders, and said insulator spacers engage said abutment shoulders when said electrodes and insulator spacers are interfitted into a nested arrangement.

4. The probe of claim 1 wherein said end cap is formed of a molded elastomer.

5. The probe of claim 1 wherein an insulator thimble is fixedly positioned within said central passageway of said body, said thimble having openings to receive said electrically conductive means, and said elastomer secures said electrically conductive means within said openings in a fluidtight relationship.

6. An axial corrosion rate probe comprising:
   a. a plurality of metal electrodes with each electrode having an axial central passageway with an intermediate portion of reduced dimension forming opposite facing abutment shoulders within said central passageway;
   b. a metal base having an axial central passageway with a central portion of reduced dimension forming at least one abutment shoulder;
   c. a plurality of insulator spacers with said spacers each having an axial central passageway carrying end portions of enlarged dimensions relative to intermediate central portions, said end portions dimensioned to telescope into said central passageways and to engage said abutment shoulders in said electrodes and said abutment shoulder in said base, and each of said insulator spacers having an opening in its sidewall;

d. an end cap adapted to be carried at the end of said central passageways of said electrodes and said insulator spacers, and said end of said central passageways being remote from said base;

e. said electrodes, insulator spacers and base interfitted into a nested arrangement with said insulator spacers separating said electrodes from one another and from said base, and said insulator spacers engaging abutment shoulders in adjacent electrodes and one of said insulating spacers engaging said abutment shoulder in said base;

f. separate electrically conductive means connected to said electrodes, and said conductive means extending through said central passageways within said electrodes, insulator spacers and into said base; and g. an elastomer molded into said central passageways within said electrodes, insulator spacers and base, for substantially filling said central passageways and integrally connecting said end cap to said electrodes and insulator spacers adjacent thereto, and said elastomer extending through said openings in said spacers for encircling said spacers between adjacent electrodes sufficiently that said nested arrangement of interfitted electrodes, insulator spacers, end cap and base are integrally connected into a unitary elongated structure.

7. The probe of claim 6 wherein said end cap is formed of a molded elastomer.

8. The probe of claim 6 wherein an insulator thimble is fixedly positioned between said abutment shoulder of said base and the end portion of an adjacent insulator spacer, said thimble having openings to receive said electrically conductive means whereby said electrically conductive means are maintained positioned within said central passageway of said base during molding of said elastomer.

9. The probe of claim 6 wherein each said electrode carries a circumferential recess formed within said intermediate portion of reduced dimension about said central passageway; and said electrically conductive means is formed of metallic resilient wire having a self-supporting, longitudinally extending portion extending into said base and a transverse loop portion received in compression within said recess, and said longitudinally extending portion residing off center of said central passageway in spaced relationship to said intermediate portions of reduced dimension of said electrodes and to each other metallic resilient wire.

10 An axial corrosion rate probe comprising:

a. a plurality of tubular metal electrodes with each electrode having a central passageway with a central portion of reduced dimension forming opposite facing abutment shoulders within said central passageway;

b. a tubular metal base having a central passageway with a central portion of reduced dimension forming at least one abutment shoulder;

c. a plurality of tubular insulator spools with said spools each having a central passageway and carrying end portions of enlarged dimensions relative to intermediate central portions, said end portions dimensioned to telescope into said central passageways and to engage said abutment shoulders in said electrodes and said abutment shoulder in said base, and each of said spools having an opening in its sidewall;

d. said electrodes, spools and base interfitted into a nested arrangement with said insulator spools separating said electrodes from one another and from said base, and said spools engaging abutment shoulders in adjacent electrodes and one of said spools engaging said abutment shoulder in said base;

e. separate electrically conductive means connected to said electrodes, and said conductive means extending through said central passageways within said electrodes, spools and into said base;

f. an end cap carried at one end of said central passageways of said electrodes, said end of said central passageway being remote from said base; an g. an elastomer molded into said central passageways within said electrodes, spools and base, for substantially filling said central passageways and integrally connecting said end cap to said electrodes, and said elastomer extending from said central passageways through said openings in said spools for encircling each of said spools between adjacent electrodes sufficiently that said nested arrangement of interfitted electrodes, spools, end cap and base are integrally connected into a unitary elongated structure.

11. The probe of claim 10 wherein said end cap is formed of a molded elastomer.

12. The probe of claim 10 wherein an insulator thimble is fixedly positioned in said central passageways between said abutment shoulder of said base and the end portion of an adjacent insulator spool, said thimble having openings to receive said electrically conductive means whereby said electrically conductive means are maintained spatially positioned within said central passageway of said base during molding of said elastomer.

13. An axial corrosion rate probe comprising:

a. a plurality of tubular metal electrodes with equal lengths and exposed cylindrical surfaces and equal radii, and each electrode having a central cylindrical passageway with a central portion of reduced diameter forming opposite facing abutment shoulders within said cylindrical passageway;

b. a tubular metal base provided with an exposed cylindrical surface and a central cylindrical passageway with a central portion of reduced diameter forming at least one abutment shoulder, and said exposed cylindrical surface and said central cylindrical passageway being substantially equal in radii to said exposed cylindrical surfaces and cylindrical passageways of said electrodes;

c. a plurality of cylindrical insulator spools with said spools each carrying circular rims at its ends and a central axial passageway, said rims having radii of sufficient dimensions that the ends of said spools telescope into said cylindrical passageways to engage said abutment shoulders in said electrodes and said abutment shoulder in said base, and each of said spools having an opening provided in its sidewall intermediate said rims;

d. said electrodes, spools and base interfitted into a nested arrangement with said insulator spools separating said electrodes from one another and from said base, and said insulator spools engaging abutment shoulders in adjacent electrodes and one of said insulating spools engaging said abutment shoulder in said base;

e. separate electrically conductive means connected to said electrodes, and said conductive means extending through said central passageways within said electrodes, spools and into said base; and f. a resilient elastomer molded into said central passageways within said electrodes, spools and base, for substantially filling said central passageways, said elastomer forming a round-nosed cylindrical end cap about one end of said nested arrangement, and said elastomer extending from said central passageways through said openings in said spools for encircling each of said spools with an exposed cylindrical surface extending longitudinally between adjacent electrodes and having like radii to said exposed cyindrical surfaces of said electrodes.

14. The probe of claim 13 wherein an insulator thimble is fixedly positioned in said central passageway of said base between said shoulder of said base and a rim at one end of said adjacent insulator spool, said thimble having openings to receive said electrically conductive means whereby said electrically conductive means are maintained positioned within said central passageway of said base during molding of said elastomer, and said elastomer securing said electrically conductive means within said openings into fluidtight relationship.

* * * * *